April 28, 1953     V. L. FRAZIER     2,636,743
RESILIENT BOLSTER FOR VEHICLE SPRING ASSEMBLY
Filed Feb. 1, 1951     2 SHEETS—SHEET 1
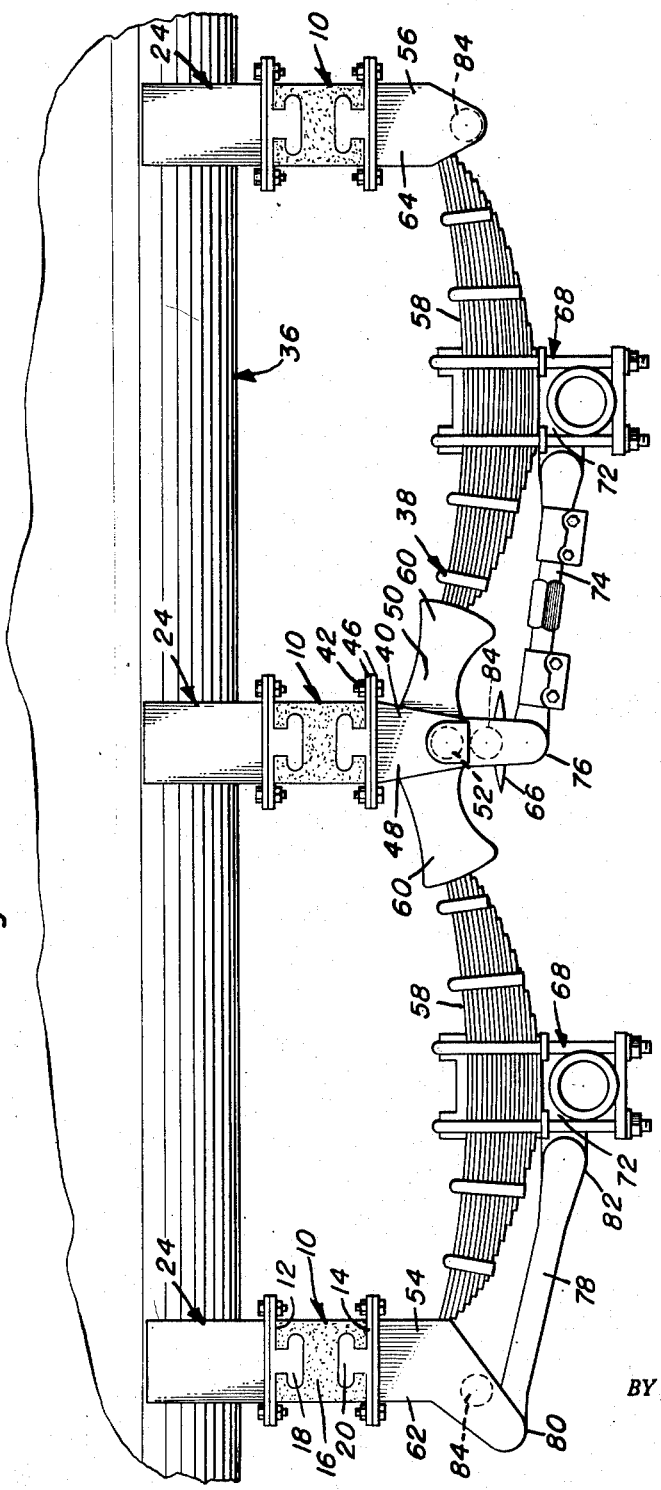
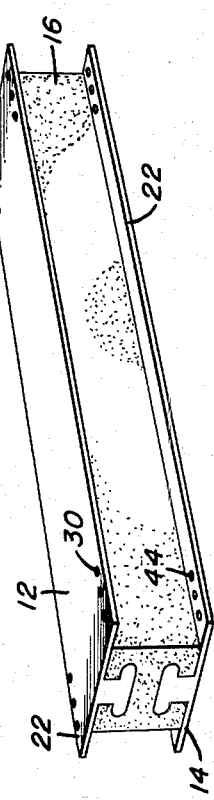
Van L. Frazier
INVENTOR.
BY *[signatures]*
Attorneys

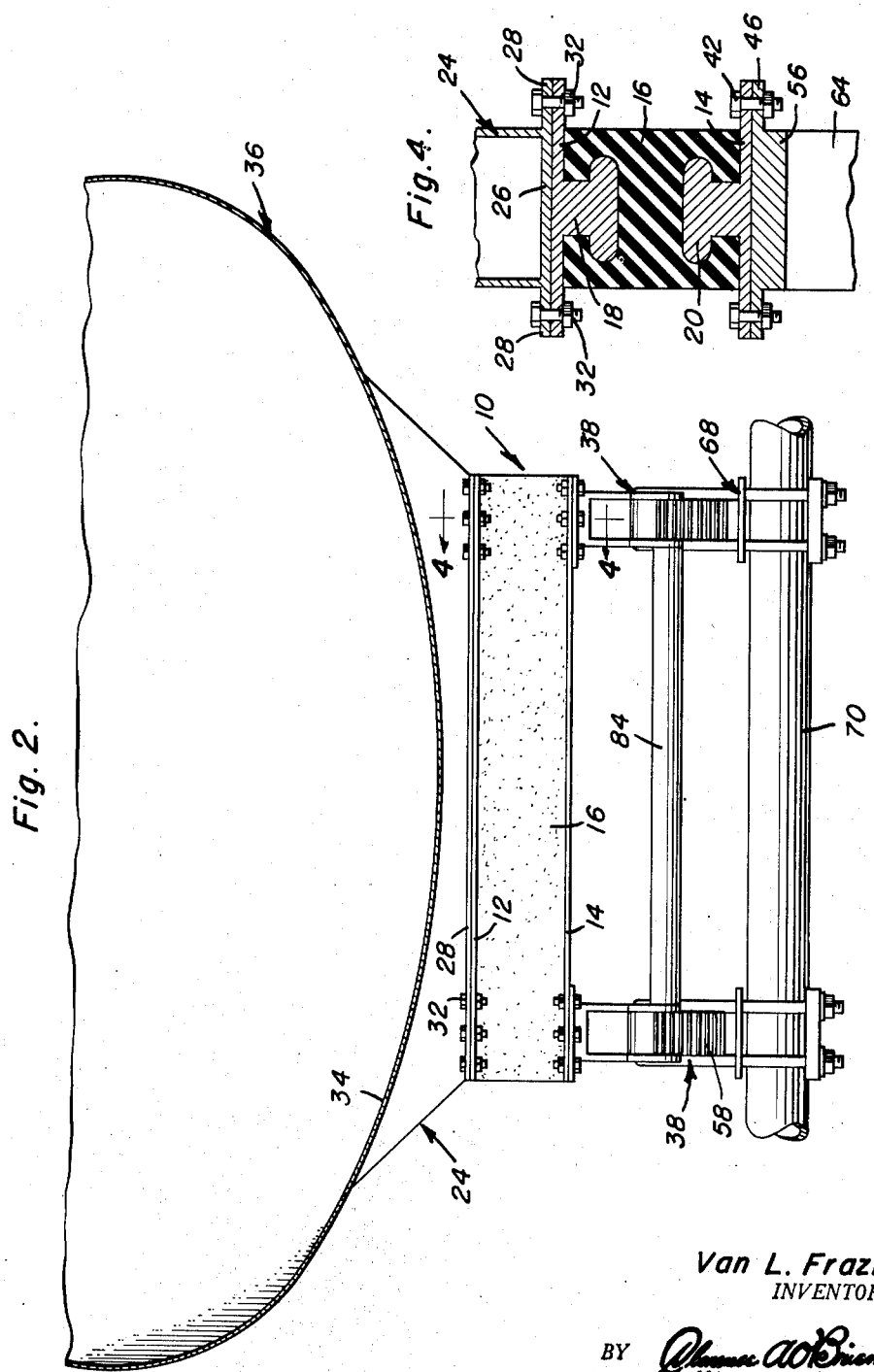

Patented Apr. 28, 1953

2,636,743

UNITED STATES PATENT OFFICE 2,636,743

RESILIENT BOLSTER FOR VEHICLE SPRING ASSEMBLY

Van L. Frazier, Springfield, Mo., assignor to Frazier Tandem Systems, Incorporated, Springfield, Mo., a corporation of Missouri Application February 1, 1951, Serial No. 208,904

6 Claims. (Cl. 280—5)

This invention relates to new and useful improvements in resilient axle suspension systems generally, and more specifically pertains to a novel resilient bolster. The subject matter disclosed herein is similar in some respects to my co-pending application, Serial No. 172,114, filed July 5, 1950, now Patent No. 2,577,322, granted December 4, 1951, and to my Reissue Patent No. 23,252, granted August 1, 1950.

The primary object of this invention is to resiliently support a transport tank or frame in such a manner as to relieve the same from excessive shocks during the travel of the transport over rough or uneven ground and also to prevent subjecting the tank or frame to twisting forces.

Another very important object of this invention is to equalize not only the loads on the tandem axles on each side of the vehicle, but also to equalize the loads applied to the axles at the opposite sides of the vehicle.

Still another important object of this invention is to provide a resilient bolster which will permit limited relative yielding movement between the upper and lower portions of the same without deformation of such upper and lower portions.

A very important feature of the present invention resides in the means by which the plates and the resilient block which form the resilient bolster are secured together, that is, by the opposed ribs on the plates being arranged to positively limit movement of the plates towards each other and to also prevent the plates being separated from the resilient block.

Still another important feature of the present invention resides in the marginal side portions of the plates extending outwardly from the resilient block so as to afford means of attachment of the resilient bolster to the cradle as well as to the brackets for mounting the springs, and also to afford means for containing the outwardly bulging portions of the resilient block when the latter is compressed between the plates.

Yet another important feature of the present invention resides in the resilient bolsters connecting the forward and rear pairs of spring mounting brackets, as well as connecting the equalizer arm brackets, the relation being such as to equalize the loads on the opposite ends of the axles, as well as to equalize the loads between the axles.

The invention has other important structural features of merit, and these as well as the advantages thereof will become apparent as the following description of the invention proceeds in conjunction with the preferred form of the same illustrated in the annexed drawings, wherein:

Figure 1 is a side elevational view of the present invention showing the same supporting a tank with only a portion of the tank being shown;

Figure 2 is an end elevational view of the construction shown in Figure 1;

Figure 3 is an enlarged perspective view of the resilient bolster; and

Figure 4 is an enlarged sectional detail view taken upon the plane of the section line 4—4 of Figure 2.

Reference is now made more specifically to the accompanying drawings, wherein like numerals designate similar parts throughout the various views, and in which there is shown three resilient bolsters, each of which is designated generally at 10.

Since the bolsters are identical in construction, it is thought that a description of one of the same will suffice for all. As best shown in Figures 3 and 4, each of the resilient bolsters 10 comprises upper and lower spaced elongated plates 12 and 14, respectively. While the plates 12 and 14 may be fabricated of such material or be of such thickness as to flex resiliently vertically, it is preferred that the same be formed of steel or cast iron of sufficient thickness to be quite rigid.

An elongated resilient block 16 is disposed between and engages the adjacent sides of the plates 12 and 14, such block 16 being formed of any suitable resilient and somewhat deformable material such as rubber or rubber-like synthetic materials such as neoprene. While not shown, it will of course be understood that if desired the material of block 16 need not be homogeneous, but may be of composite construction such as rubber having flexible reinforcing material such as cord or fabric embedded therein.

Formed integral with or, if preferred, rigidly attached to the adjacent sides of the plates 12 and 14 are longitudinally extending medial ribs 18 and 20, respectively, which ribs 18 and 20 are embedded in the opposite sides of the block 16, it being noted that the ribs tend to reinforce the plates 12 and 14 for rigidity of the latter. As clearly shown in the drawings, the ribs 18 and 20 are transversely enlarged in spaced relation to the plates so as to be T-shaped in cross-section to insure retainment of the ribs in the block. Further, the ribs 18 and 20 are directly opposed and in spaced relation to each other to limit positively the movement of the plates 18 and 20 towards each other during compression of the block 16 therebetween. It should be stated, however, that it is not contemplated that the bolster 10 should ever be subjected to forces sufficient to bring the ribs 18 and 20 into contact with each other, but such construction will prevent complete collapse of the block 16 under the most extreme load conditions on the bolster 10.

The side marginal portions of the plates 12 and 14 extend outwardly from the resilient block 16 to define attaching flanges 22 for the bolster 10, it being noted that in addition such marginal portions or flanges 22 serve to confine the resilient block 16 when the latter bulges due to being compressed between the plates 12 and 14.

As best shown in Figures 1 and 2, cradles designated generally at 24 are mounted on the top of the resilient bolsters 10 and are rigidly attached thereto. While it will be apparent that the cradles 24 may be formed integral with the plates 12 of the resilient bolsters, so as to constitute an integral part of the resilient bolsters, it is preferred that the cradles 24 may be detachably secured to the resilient bolsters. For this purpose, each of the cradles 24 is provided with a mounting plate 26 at its bottom, which mounting plate 26 corresponds in size to the plates 12, and which plate 26 projects laterally from the opposite sides of the cradle 24 to define mounting flanges 28 for the cradles, as clearly shown in Figure 4. The flanges 22 of the plate 12 and the flange portions 28 of the plate 26 are provided with aligned apertures 30 through which apertures fastening bolts 32 extend to secure the flanges 22 and 28 together. As will be clearly apparent upon inspection of the drawings, the cradles 24 are elongated and the tops of the same are longitudinally concaved, as at 34, to provide seats for the convex bottom wall of a liquid containing tank designated generally at 36. If deemed necessary, or expedient, suitable means, not shown, may be provided to secure the cradles 24 to the tank 36.

A pair of spring assemblies, designated generally at 38, is provided for supporting the opposite ends of the bolsters 10. Inasmuch as the spring assemblies 38 are duplicates of each other, it is thought that it will be sufficient for the purposes of this description to describe in detail only the spring assembly 38 shown in Figure 1 that is adapted to be disposed at the left hand side of the vehicle. As best shown in Figures 1 and 2, it will be appreciated that the spring assembly 38 is substantially the same as that disclosed in my co-pending application, Serial No. 172,114, filed July 5, 1950, and which is described in considerable detail therein. Briefly, the assembly 38 comprises an equalizer arm bracket 40 attached to the underside of the middle bolster 10 by means of fastening bolts 42 that extend through suitable apertures 44 in the flanges 22 and an attaching flange 46 carried at the top of the bracket 40. The bracket 40 includes a pair of depending spaced side walls 48 between which is pivotally mounted an equalizer arm 50 on a pivot shaft 52 connecting the spaced side walls 48.

Attached to the underside of the forward bolster 10 in a manner similar to which the bracket 40 is attached to the middle bolster 10 is a forward spring mounting bracket 54, and in an analogous manner a rear spring mounting bracket 56 is secured to the underside of the rear bolster 10. A pair of longitudinally spaced, elongated springs 58 of the leaf type is provided, the adjacent ends of the springs 58 being engaged with inverted U-shaped portions 60 formed at the opposite ends of the centrally pivoted equalizer arm 50. The spring mounting brackets 54 and 56 include spaced side walls 62 and 64 respectively, and the opposite ends of the springs 58 are received between the side walls 62 and 64 to engage the undersides of spring seats, not shown, associated with the brackets 54 and 56. As in my co-pending application mentioned above, a perch 66 connects the spaced side walls 48 of the bracket 40, the opposite ends of the perch 66 being adapted to engage the undersides of the adjacent ends of the springs 58, when the latter are moved to their extreme positions upon rocking movement of the equalizer arm 50, as will be understood.

Means designated generally at 68 is provided to secure the central portions of the springs 58 to a pair of tandem axles, only one of such axles being shown, such illustrated axle being designated at 70 in Figure 2. The means 68 includes axle chairs 72, and an adjustable torque arm 74 has its opposite ends pivotally connected to the lower end of the bracket 40, as at 76, and to the axle chair 72 associated with the rearmost spring 58. A further torque arm 78 has its opposite ends pivoted to the lower end of the bracket 54, as at 80, and to the forward portion of the axle chair 72 associated with the foremost spring 58, as at 82. With the assemblies 38 fixed to the underside of the bolsters 10, the entire construction is further reinforced by the provision of rods 84, which rods 84 are disposed parallel to the bolsters 10 and connect the brackets connected thereto, as clearly shown in Figures 1 and 2.

From the foregoing, the construction and operation of the device will be readily understood and further explanation is believed to be unnecessary. However, since numerous modifications and changes will readily occur to those skilled in the art after a consideration of the foregoing specification and accompanying drawings, it is not desired to limit the invention to the exact construction shown and described, but all suitable modifications and equivalents may be resorted to, falling within the scope of the appended claims.

Having described the invention, what is claimed as new is:

1. A resilient bolster comprising, an elongated cradle, the top of the cradle being longitudinally concaved for supporting a tank thereon, laterally extending mounting flanges along the lower edges of the cradle, a pair of elongated, vertically spaced parallel plates disposed below the cradle, an elongated resilient block received between and engaging the adjacent sides of the plates, longitudinally extending ribs on the adjacent sides of the plates embedded in the opposite sides of the block, the marginal side portions of the upper plate extending outwardly from the resilient block, and fastening means securing the flanges to the marginal portions.

2. A resilient bolster comprising, an elongated cradle, the top of the cradle being longitudinally concaved for supporting a tank thereon, laterally extending mounting flanges along the lower edges of the cradle, a pair of elongated, vertically spaced parallel plates disposed below the cradle, an elongated resilient block received between and engaging the adjacent sides of the plates, longitudinally extending ribs on the adjacent sides of the plates embedded in the opposite sides of the block, said ribs being in directly opposed spaced relation to each other and also being transversely enlarged in spaced relation to the plates, the marginal side portions of the upper plate extending outwardly from the resilient block, and fastening means securing the flanges to the marginal portions.

3. Means for resiliently supporting a carrier upon tandem axles comprising, three transversely extending resilient bolsters for cooperatively supporting a carrier thereon, said bolsters being horizontal and disposed in spaced side by side relation, each of said bolsters comprising a pair of elongated, vertically spaced plates, an elongated resilient block disposed between and engaging the adjacent sides of the plates, the elongated ribs on the adjacent sides of the plates embedded in the block, means for supporting all of the bolsters comprising an equalizer arm mounting bracket secured to the middle bolster, spring mounting brackets secured to the bolsters on opposite sides of the middle bolster, an equalizer arm centrally pivoted on the equalizer arm bracket, longitudinally spaced elongated springs, the adjacent ends of the springs being operatively connected to the opposite ends of the equalizer arm, the opposite ends of the springs being operatively connected to the spring mounting brackets, a pair of torque arms, one of the torque arms having its opposite ends pivoted to one of the spring mounting brackets and to an intermediate portion of one of the springs, the other torque arm having its opposite ends pivoted to the equalizer arm bracket and an intermediate portion of the other spring, and means for securing the springs at positions intermediate their ends to tandem axles.

4. Means for resiliently supporting a carrier upon tandem axles comprising, three transversely extending resilient bolsters for cooperatively supporting a carrier thereon, each of said bolsters comprising a cradle, an elongated upper plate carried by the cradle, a lower plate disposed directly below the upper plate, an elongated resilient block disposed between and engaging the adjacent sides of the plates, elongated ribs on the adjacent sides of the plates embedded in the resilient block, said bolsters being horizontal and disposed in spaced side by side relation, means for supporting all of the bolsters comprising an equalizer arm mounting bracket secured to the middle bolster, spring mounting brackets secured to the bolsters on opposite sides of the middle bolster, an equalizer arm centrally pivoted on the equalizer arm bracket, longitudinally spaced elongated springs, the adjacent ends of the springs being operatively connected to the opposite ends of the equalizer arm, the opposite ends of the springs being operatively connected to the spring mounting brackets, a pair of torque arms, one of the torque arms having its opposite ends pivoted to one of the spring mounting brackets and to an intermediate portion of one of the springs, the other torque arm having its opposite ends pivoted to the equalizer arm bracket and an intermediate portion of the other spring, and means for securing the springs at positions intermediate their ends to tandem axles.

5. In an assembly for resiliently supporting a carrier, a pair of transversely extending resilient bolsters, cradles carried by the bolsters for supporting a carrier thereon and each having laterally extending mounting flanges, each of said bolsters comprising a pair of elongated, vertically spaced plates, an elongated resilient block disposed between and engaging the adjacent sides of the plates, the marginal side portions of the upper plate extending outwardly from the block, fastening means securing said marginal side portions to said mounting flanges, elongated ribs on the adjacent sides of the plates embedded in the block, and an elongated spring having its opposite ends operatively connected to the bolsters for supporting the latter, and means for securing an intermediate portion of the spring to an axle.

6. In a vehicle for transporting liquids, three transversely extending bolsters, each of said bolsters comprising a pair of elongated, vertically spaced plates, an elongated resilient block disposed between and engaging the adjacent sides of the plates, elongated ribs on the adjacent sides of the plates embedded in the block, cradles carried by the bolsters for supporting a tank at longitudinally spaced positions, a tank supported on the cradles, said bolsters being horizontal and disposed in spaced side by side relation, means for supporting all of the bolsters comprising an equalizer arm mounting bracket secured to the middle bolster, spring mounting brackets secured to the bolsters on opposite sides of the middle bolster, an equalizer arm centrally pivoted on the equalizer arm bracket, longitudinally spaced elongated springs, the adjacent ends of the springs being operatively connected to the opposite ends of the equalizer arm, the opposite ends of the springs being operatively connected to the spring mounting brackets, a pair of torque arms, one of the torque arms having its opposite ends pivoted to one of the spring mounting brackets and to an intermediate portion of one of the springs, the other torque arm having its opposite ends pivoted to the equalizer arm bracket and an intermediate portion of the other spring, and means for securing the springs at positions intermediate their ends to tandem axles.

VAN L. FRAZIER.

References Cited in the file of this patent

UNITED STATES PATENTS

| Number | Name | Date |
|---|---|---|
| 1,551,084 | Betts | Aug. 25, 1925 |
| 1,610,037 | Canevaro | Dec. 7, 1926 |
| 2,048,149 | Voorhees | July 21, 1936 |
| 2,417,690 | Keller | Mar. 18, 1947 |
| 2,508,634 | Ziegler | May 23, 1950 |

FOREIGN PATENTS

| Number | Country | Date |
|---|---|---|
| 688,330 | Germany | Feb. 17, 1940 |